US007010889B1

(12) United States Patent
Renfro

(10) Patent No.: US 7,010,889 B1
(45) Date of Patent: Mar. 14, 2006

(54) RISER SUPPORT CLAMP FOR PIPE RISER OR CONDUIT

(76) Inventor: Bill J. Renfro, 2214 Belle Grove Dr., Richmond, TX (US) 77469

( * ) Notice: Subject to any disclaimer, the term of this patent is extended or adjusted under 35 U.S.C. 154(b) by 0 days.

(21) Appl. No.: 11/041,037

(22) Filed: Jan. 24, 2005

Related U.S. Application Data

(63) Continuation-in-part of application No. 10/438,658, filed on May 16, 2003, now abandoned.

(51) Int. Cl.
*F16L 3/10* (2006.01)
*E04C 2/52* (2006.01)

(52) U.S. Cl. .................. 52/219; 52/220.8; 52/232; 285/415; 138/106; 277/607

(58) Field of Classification Search ............. 52/219, 52/220.8, 232; 285/42, 123.4, 414, 415; 138/106; 277/606, 607
See application file for complete search history.

(56) References Cited

U.S. PATENT DOCUMENTS

| 501,835 | A | * | 7/1893 | Heidnereiter ............... 285/13 |
| 1,234,748 | A | * | 7/1917 | McMurtie .................. 74/495 |
| 1,263,789 | A | * | 4/1918 | Morrison .................. 53/302.5 |
| 1,494,234 | A | * | 5/1924 | Gossett ..................... 285/42 |
| RE16,018 | E | * | 3/1925 | Canfield .................... 277/324 |
| 1,646,639 | A | * | 10/1927 | Crowell .................... 285/123.4 |
| 1,710,060 | A | * | 4/1929 | Metcalf, Jr. ............... 285/149.1 |
| 2,173,037 | A | * | 9/1939 | Dailey ..................... 285/123.4 |
| 2,768,007 | A | * | 10/1956 | Brenner .................... 285/123.4 |
| 2,784,988 | A | * | 3/1957 | Banchback ............... 285/123.4 |
| 3,224,796 | A | * | 12/1965 | Burkitt .................... 285/149.1 |
| 4,150,848 | A | * | 4/1979 | Dyrup ...................... 285/238 |
| 4,249,353 | A | * | 2/1981 | Berry ....................... 52/232 |
| 4,364,210 | A | | 12/1982 | Fleming et al. |
| 4,433,860 | A | * | 2/1984 | Lindquist .................. 285/192 |
| 4,730,421 | A | * | 3/1988 | Leeland .................... 52/58 |
| 4,840,194 | A | * | 6/1989 | Berry ....................... 138/155 |
| 4,901,488 | A | | 2/1990 | Murota et al. |
| 4,934,117 | A | * | 6/1990 | Barksdale .................. 52/219 |
| 5,351,448 | A | * | 10/1994 | Gohlke et al. .............. 52/1 |
| 5,417,019 | A | | 5/1995 | Marshall et al. |
| 5,456,050 | A | | 10/1995 | Ward |
| 5,887,395 | A | | 3/1999 | Navarro et al. |
| 5,947,159 | A | | 9/1999 | Takahashi |
| 5,970,667 | A | * | 10/1999 | Thaler ...................... 52/219 |

(Continued)

FOREIGN PATENT DOCUMENTS

JP 1-278657 * 11/1989

*Primary Examiner*—Robert Canfield
(74) *Attorney, Agent, or Firm*—John D. Gugliotta; Olen L. York, III

(57) ABSTRACT

A riser clamp mateable with a riser, wherein the riser clamp supports a column of the riser as material passes therein, and the riser clamp further covers or seals the opening in the partition formed through which the riser passes. The riser clamp comprises a pair of clamp members adjoined to a riser. The clamp members comprise a semi-annular jacket seated against the riser, a collar circumscribing the jacket, wherein the collar covers an opening formed in a partition through which the riser passes. The clamp members further have a pair of mounting flanges depending from the jacket and the collar, with the mounting flanges extending laterally in opposing directions from the jacket and coplanar to a medial margin. Each one of the mounting flanges accommodates a fastener for adjoining the pair of clamp members securely about the riser.

10 Claims, 13 Drawing Sheets

U.S. PATENT DOCUMENTS

| | | |
|---|---|---|
| 5,970,670 A | 10/1999 | Hoffman |
| 6,176,052 B1 * | 1/2001 | Takahashi .................... 52/232 |
| 6,360,502 B1 | 3/2002 | Stahl, Jr. |
| 6,561,723 B1 * | 5/2003 | McCurdy et al. ........... 403/312 |
| 6,601,852 B1 * | 8/2003 | Kogler et al. ............... 277/314 |
| 6,627,817 B1 * | 9/2003 | Kortenbach ............... 174/74 R |

* cited by examiner

RISER SUPPORT CLAMP FOR PIPE RISER OR CONDUIT

RELATED APPLICATIONS AND DISCLOSURES

This application is a continuation-in-part of prior U.S. patent application Ser. No. 10/438,658, filed on May 16, 2003, now abandoned, incorporated by reference as if fully rewritten.

BACKGROUND OF THE INVENTION

1. Field of the Invention

The present invention relates generally to the field of conduit bracing and fire safety, and, more particularly, to a riser support clamp for a pipe riser or conduit.

2. Description of the Related Art

Various plumbing construction procedures require a variety of specialty parts and accessories to provide for a professional appearing installation that meets all applicable building codes. One area that is frequently addressed in any inspection activity is pipe that passes through a floor, wall or ceiling. Pipe or conduit that is routed vertically and passes through a floor or ceiling must be supported at the floor to hold the weight of the pipe and the material passing therethrough. Previously, this entailed using a field fabricated clamp that spreads the weight of the pipe out in only two directions. Depending on the weight of the pipe and the type of floor construction, these clamps could be quite long and occupy much valuable floor space. After the clamps were installed, fireproof sealant, concrete, grout, caulking or other similar sealing materials were applied about the circumference of the pipe. Thus, the application of a sealant required a second installation step that is messy and consumes additional time and material. Furthermore, if a pipe must be removed for modifications, remodeling and/or renovation to the existing structure, the removal of applied sealants can be difficult and equally messy. Accordingly, there is a need for a means by which vertically mounted pipes and/or conduits can be secured and provide fire-resistance in a single device that is easy to use without the disadvantages as previously described and disclosed within the patents provided below.

An example of a device similar to that of the present invention is provided at http://www.cooperbline.com/pdf/catalogs/ProductInformation/PH03%20PDF-WebPI /PC-StandardRiserClamp.pdf, and sold by B-LINE® Systems, Inc., which offers twenty-one (21) separate pipe clamps designed to support and stabilize vertical pipe runs. A riser pipe clamp corresponding to a nominal pipe diameter of four (4) inches (indicated as part number B3373-4) indicates a design load capacity of approximately 810 pounds. The riser pipe clamp exemplifies the prior art and is depicted in FIG. 1.

An exemplary embodiment of the prior art is depicted in FIG. 1 as a riser pipe clamp 50 comprising identical clamps 52a and 52b coupled about a pipe 54. Each clamp 52a and 52b comprises a semi-annular collar 56 intermediately disposed between linearly elongated wings or arms 58. The semi-annular collars 56 are placed about the pipe 54 so that the collars 56 cumulatively circumscribe the circumference of the pipe 54. The wings or arms 58 of each clamp 52a and 52b are coupled by bolt and nut 60 combinations (or other similar means) so as to couple the clamps 52a and 52b securely about the pipe 54 for structural support.

FIG. 2 depicts the riser pipe clamp 50 of FIG. 1, or a clamp 50 of similar or substantially similar configuration. The clamp 50 is depicted as installed on the pipe 54. Installation is performed in accordance with building codes, specifically addressing the securement of pipe (that may run vertically or horizontally depending upon the architectural requirements) and the steps necessary for fireproofing adjacent areas, including from floor-to-floor or room-to-room. In accordance with such codes, and as depicted in FIG. 2, the pipe 54 is wrapped in a layer of fiberglass insulation 62. The pipe 54 is also circumscribed by a fire barrier wrap or strip 64 (such as a fire barrier manufactured by 3M®) for inhibiting the transfer or penetration of heat and/or flame from one floor or room to an adjacent floor or room. Material 66 for damming any space between the fire barrier wrap or strip 64 and the floor or wall slab 68. The combination of the insulation 62, the fire barrier wrap or strip 64 and the damming material 66 fill any space between the pipe 54 and the floor or wall slab 68, thereby sealing the opening provided through which the pipe 54 runs. A caulk 70 material is placed between the slab 68 and the pipe 54 (and insulation 62), the caulk 70 adjacent the strip 64 and material 66 (so as to be adjacent the clamp 50). The caulk 70 is used to seal the opening, to adhere and secure the pipe 54 and other material together, and to minimize or inhibit the transfer or penetration of heat and/or flame from floor-to-floor or room-to-room. The caulk 70 is envisioned as the type that inhibits heat and/or flame (such as a fire barrier caulk manufactured by 3M®). The clamp 50 may include a plurality of shear pins 72 welded to the pipe 54. The shear pins 72 prevent the pipe 54 from sliding down through the clamp 50. Without the pins 72, the pipe 54 would slide down and through the clamp 50 and may result in structural failure of the pipe 54 at one or various points (including joints and junctures) and/or structural failure to the clamp 50.

Referring now to FIG. 17 and FIG. 18, the prior art is depicted to provide an example of the installation of several clamps and pipe risers in a confined space or area. For instance, in FIG. 17, two large pipe risers 54a are installed using the conventional riser clamps 50a as described above. A smaller pipe riser 54b is installed using a smaller version of the conventional riser clamp 50b described above. The length of the wings or arms 58 of each clamp 50a and 50b result in an inefficient use of space, wherein the respective pipe risers 54a and 54b are spaced to accommodate the length of the clamps 50a and 50b. Likewise, in FIG. 18, a variation of the two large pipe risers 54a and the smaller piper riser 54b is depicted, in which a more efficient use of the space is achieved relative to that in FIG. 17. However, the variation in FIG. 18 still results in inefficient space usage because of the cumbersome length of the clamps 50a and 50b. By comparison, and as shall be described in greater detail below, FIG. 19 and FIG. 20 depict embodiments using a combination of the improved clamps of the present invention with a convention clamp 50 (see FIG. 19) or a combination entirely comprising the improved clamps of the present invention in lieu of conventional clamps 50 (see FIG. 20). The use of the improved clamps of the present invention in lieu of the conventional clamps results in a maximization of space usage.

The aforementioned embodiment, and related devices in the art, suffer from several drawbacks. Noticeably, the clamp 50, due to the length of the wings or arms 58, consumes a disproportionate amount of space and forces adjacently running pipe to be spaced at distances that make inefficient use of the construction space available. The clamp 50 has a limited surface area that contacts a pipe riser 54, which thereby limits and minimizes the bearing, gripping and weight capacity, respectively and collectively, of the clamp 50. As such, the clamp 50 is useful but highly inefficient and ineffective at securing a pipe riser 54 beyond a limited weight and force capacity (approximately 810 pounds, as noted above). Additionally, the clamp 50 fails to cover the opening in the floor or wall, which prevents the proper climate control between adjacent floors or walls, and which further fails to prevent or inhibit the spread of flames unless flame retardant material is incorporated into the installation process.

The present invention, embodied in FIG. 3 through FIG. 16, and FIG. 19 through FIG. 22, is an improvement over the conventional clamps 50 depicted and described in the prior art. The present invention eliminates or reduces the size of the wings or arms 58 of the prior art clamps 50, thereby allowing a more efficient use of construction space and materials. Furthermore, and as shall be described below, the present invention provides a greater surface area that contacts the pipe riser, increasing the bearing and gripping surfaces and the weight capacity that the clamp is capable of handling, thereby reducing the likelihood that the pipe may slip from or through the clamp. The present invention also covers the opening in the floor or wall, thereby reducing the likelihood of flame transfer from floor-to-floor or room-to-room. Finally, the present invention is constructed from metal that reduces the spread of fire/flames between floor-to-floor or room-to-room.

Consequently, a need has been felt for providing an improved pipe riser clamp support. The present invention provides an improved pipe riser clamp support that overcomes all the deficiencies outlined above, and provides other advantages and benefits detailed below.

SUMMARY OF THE INVENTION

It is therefore an object of the present invention to provide a riser clamp mateable with a riser, wherein the riser clamp supports a column of the riser as material passes therein, and the riser clamp further covers or seals the opening in the partition formed through which the riser passes.

In one embodiment, the present invention provides a riser clamp comprising a pair of clamp members adjoined to a riser. The clamp members comprise a semi-annular jacket seated against the riser, a collar circumscribing the jacket, wherein the collar covers an opening formed in a partition through which the riser passes. The clamp members further have a pair of mounting flanges depending from the jacket and the collar, with the mounting flanges extending laterally in opposing directions from the jacket and coplanar to a medial margin. Each one of the mounting flanges accommodates a fastener for adjoining the pair of clamp members securely about the riser.

The jacket has a radius complimentary to a radius of the riser. The jacket further has a vertical length exceeding the width of the collar. The radius and the vertical length combine to provide increased surface area contacting the riser, thereby reducing point load stress imparted on the partition. The increased surface area also increases the weight bearing capacity of the clamp members and prevents slippage of the riser from the clamp members.

The collar is seated onto the partition to inhibit spreading of flames from adjacent sections. A clamp member may have a collar that has a polygonal shape or an irregular shape, and may be adjoined to a clamp member having a collar of the same polygonal shape, a different polygonal shape, or an irregular shape. The irregular shape comprises a linear side parallel to said medial margin and arcuate sides disposed between the medial margin and the linear side, the arcuate sides intersecting at opposing ends of the linear side.

The clamp members are manufactured from metal to inhibit spreading of flames from adjacent sections, and further inhibiting heat transfer from adjacent sections (floor-to-floor or room-to-room).

Another embodiment of a riser clamp comprises a annular gasket ring installed between the collar of the riser clamp and the floor or wall surface, thereby providing further resistance to and protection from ingress and egress of smoke and/or fire.

Another objects of the present invention includes providing a riser clamp that is easily installed, uninstalled and maintained.

Still another object of the present invention includes providing a riser clamp that is provided with various collar embodiments with alternate peripheral configurations so that the riser clamp installation is capable of on-site modification and adaptability as dictated by space available on the floor or wall.

A method of installing a pair of riser clamps on a riser comprises the steps of installing a riser clamp on the riser on one side of a partition and installing an additional riser clamp on the riser on an opposing side of the partition. By placing a riser clamp on each side of the partition, the riser clamps impart more surface area contacting the riser for increased securement and load bearing capacity. Furthermore, the opening in the partition through which the riser passes is further sealed and the transfer of flame, smoke, gas or heat is further inhibited.

A method of installing a plurality of riser clamps on a plurality of risers comprises the steps of installing a riser clamp on a first riser on a side of a partition, installing another riser clamp on a second riser adjacent the first riser on the side of the partition, and repeating installation of any additional riser clamps on any additional risers. The method further comprises the step of installing an additional riser clamp on the first riser or the second riser on an opposing side of the partition. The method further comprises the step of installing an additional riser clamp on the remaining first riser or the remaining second riser on the opposing side of the partition. The method further comprising the step of repeating installation of any additional riser clamps on the opposing side of the partition to any remaining risers. This method describes the installation of several riser clamps onto several adjacent risers. The riser clamp configurations allow the risers to be placed in a more compacted and space conscious arrangement generally in a spatial relationship closer than is otherwise possible with conventional riser clamps. This method envisions the user of riser clamps on each side of the partition, if desired, for the increased securement and flame, smoke and gas inhibition provided for in the method of the previous paragraph.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

Figure 1:
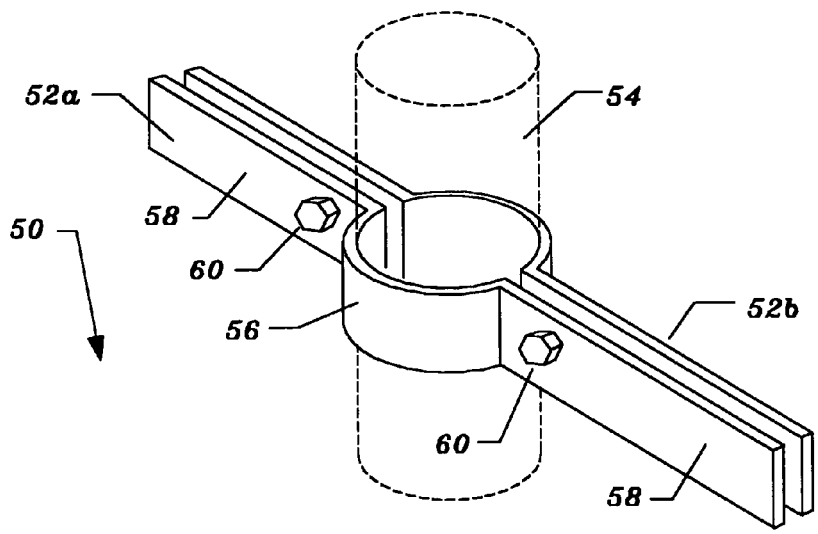
FIG. 1 is a perspective view of the "PRIOR ART" of a conventional riser clamp assembly having a pair of clamp members adjoined about a riser, wherein the clamp members have arms laterally extending away from the throat or neck of the clamp and through which fasteners are used to couple the clamp members about the riser.
Figure 2:
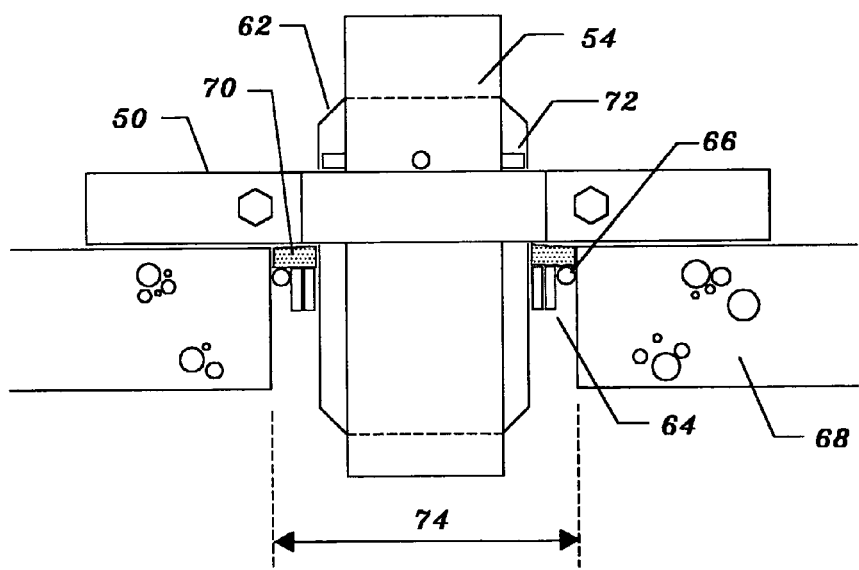
FIG. 2 is a side view of one exemplary embodiment of the "PRIOR ART" installed onto a riser and placed adjacent to a partition.
Figure 3:
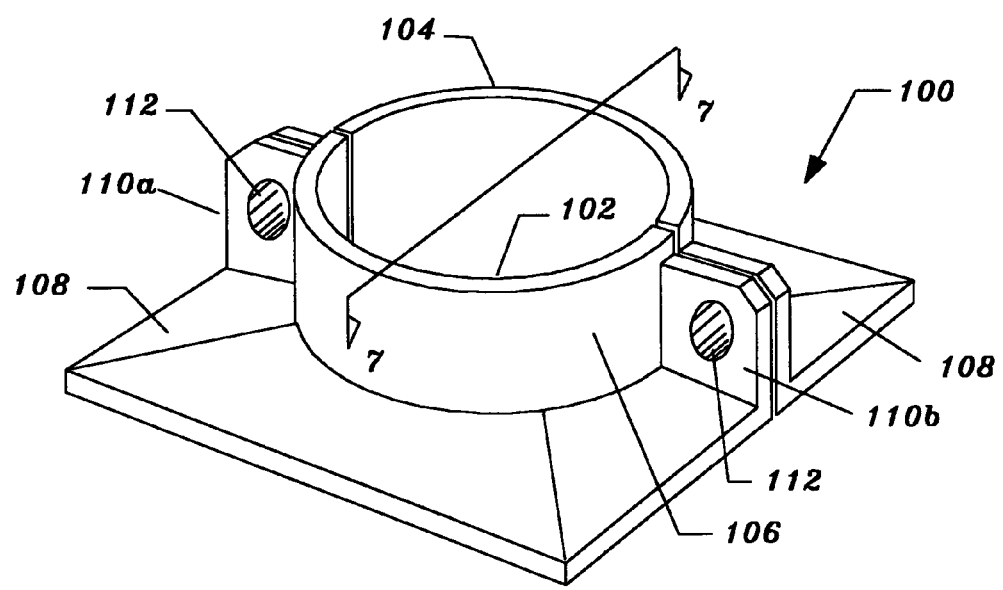
FIG. 3 is a perspective view of one exemplary embodiment of the present invention, wherein the riser clamp has a pair of clamp members, the clamp members having a polygonal collar circumscribing a collar that is mated to a riser, and having mounting flanges for coupling the clamp members with fasteners.
Figure 4:
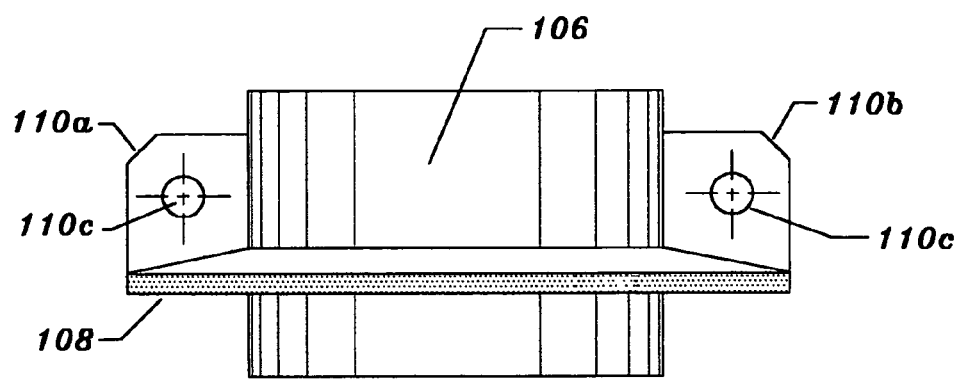
FIG. 4 is a side view of FIG 3.
Figure 5:
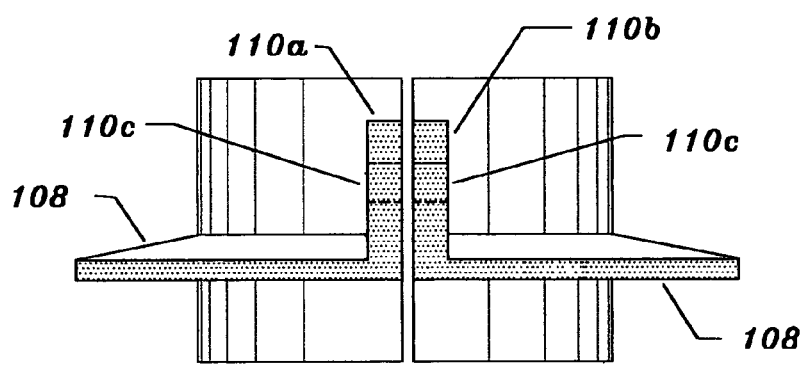
FIG. 5 is a front or rear view of FIG. 3.
Figure 6:
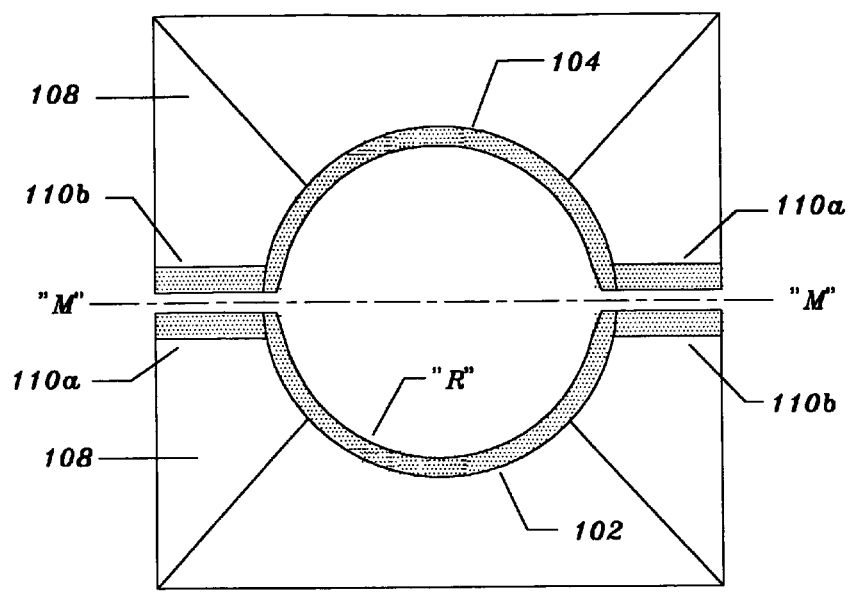
FIG. 6 is a plan view of FIG. 3.
Figure 7:
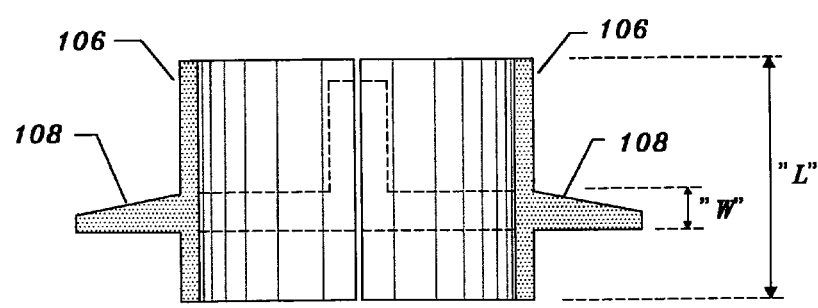
FIG. 7 is a sectional view of FIG. 3, and in combination with FIG. 4, FIG. 5 and FIG. 6, depict the collar as having a length greater than the width of the collar, thereby creating more surface area contacting the riser, increasing securement and load bearing capacity of the riser clamp.

In order to clearly described the invention, it is necessary to define several terms repeatedly used in the description.

As used in the application, "partition" is used to define a division between sections, such as floors or rooms. Thus, a "partition" may divide one floor from an adjacent floor above or below. "Partition" may also divide one room from an adjacent room. "Partition" may be used to describe a divider made from a variety of materials, including concrete slabs, wood, or other suitable material used in construction to divide floors or rooms from one another.

"Section" is used to indicate a room or a floor (as indicated above) bounded by a "partition" as defined above. For example, a first section is separated from a second section by a partition, such that the first section is a floor or room adjacent to the second section that is also a floor or room, respectively.

The phrases "riser", "pipe" and "conduit" are used interchangeably to indicate a metal or plastic tubular structure that carries or provides a route for material, including fluid, air or solids, or a combination thereof.

The best mode for carrying out the invention is presented in terms of its preferred embodiment, herein depicted within the FIGS. 3 through 22.

1. Detailed Description of the Figures

Referring to FIG. 3 through FIG. 22, a riser clamp 100 comprises a pair of clamp members 102 and 104 adjoined to a riser 54. The clamp members 102 and 104 are mirror images of one another, thus a discussion of one clamp member serves as a representative description of each member 102 and 104. The members 102 and 104 each comprise a semi-annular jacket 106 seated against the riser 54, a collar 108 circumscribing the jacket 106. The collar 108 covers an opening 74 formed in a partition 68 through which the riser 54 passes. A pair of mounting flanges 110a and 110b depend from the jacket 106 and the collar 108. The mounting flanges 110a and 110b extend laterally in opposing directions from the jacket 106 and coplanar to a medial margin "M" (see FIG. 6). Each of one of the mounting flanges 110a and 110b accommodates a fastener 112 for adjoining the pair of clamp members 102 and 104 through an aperture 110c formed in each mounting flange 110a and 110b.

The jacket 106 has a radius "R" (see FIG. 6) complimentary to a radius of the riser 54. The jacket 106 also has a vertical length "L" exceeding the vertical width "W" of the collar (see FIG. 7). The radius and the vertical length provide increased surface area contacting the riser 54, thereby reducing point load on the partition 68. The increases surface area provided by the jacket 106 that contacts the riser 54 prevents or inhibits slippage of the clamp members 102 and 104 from the riser 54. The increased surface area contacting the riser 54 also increases the weight bearing capacity of the clamp members 102 and 104.

Figure 8:
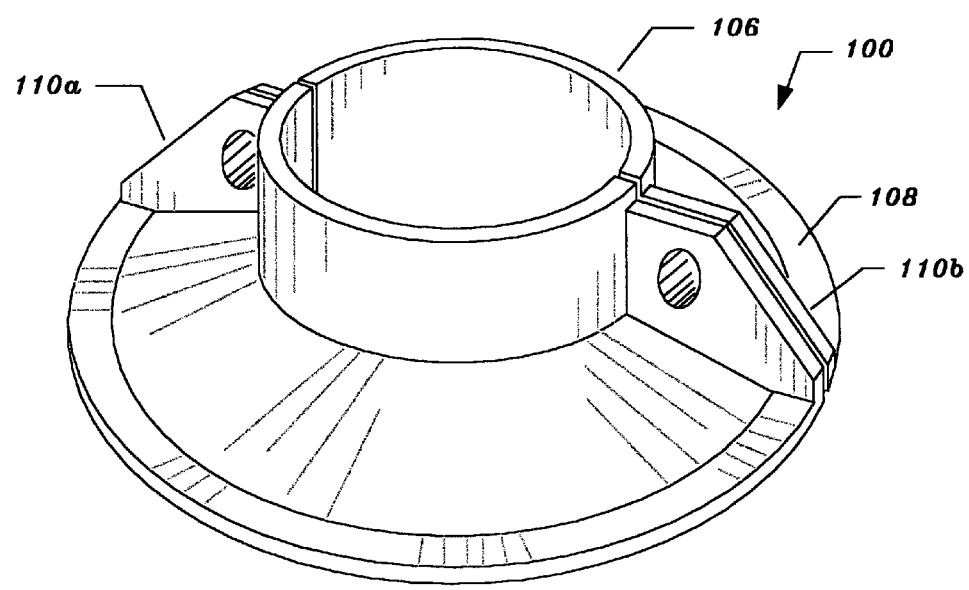
FIG. 8 is a perspective view of a riser clamp for conduits with an integrated collar.
Figure 9:
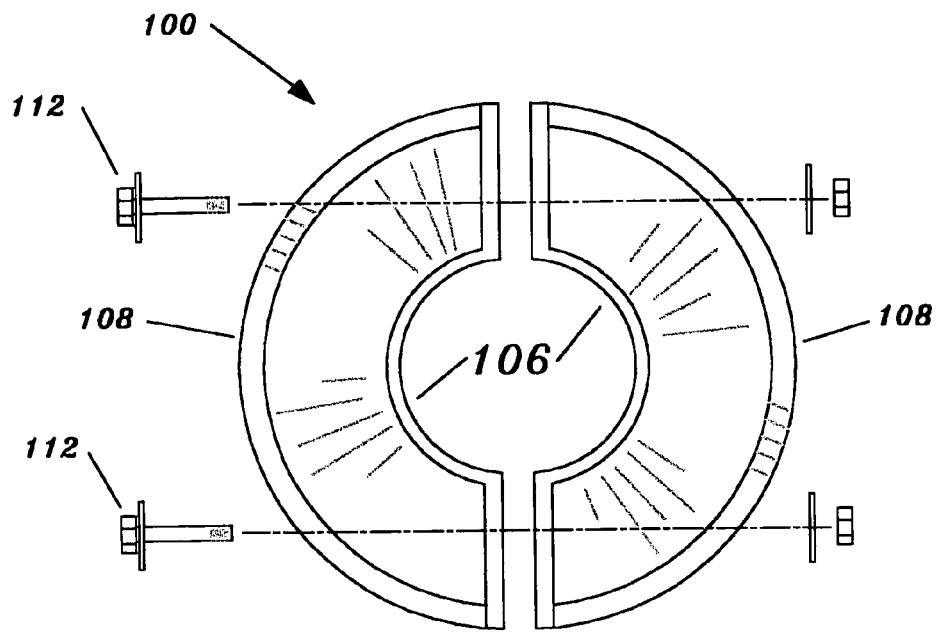
FIG. 9 is a top view of the riser clamp depicting a pair of semi-annular members separated about the midline junction and with attachment means removed.
Figure 10:
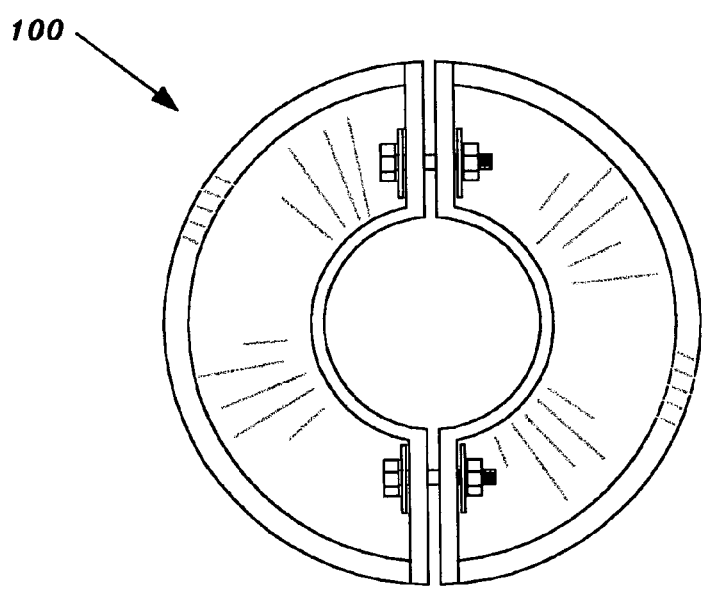
FIG. 10 is a top view of the riser clamp assembled.
Figure 11:
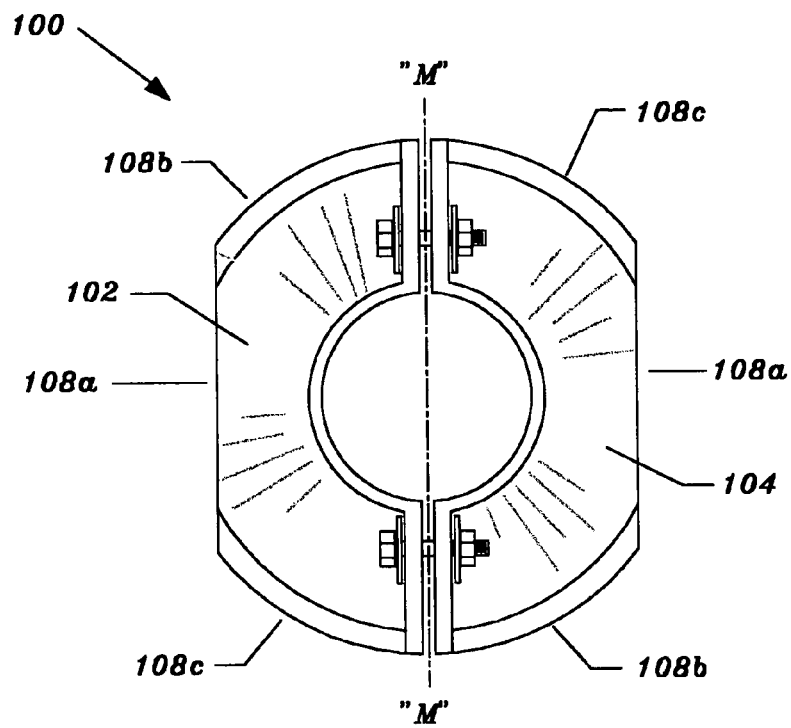
FIG. 11 is a top view of an alternate embodiment of the outer periphery of the collars, wherein the collars include linear sides and arcuate sides intermediate thereto.
Figure 12:
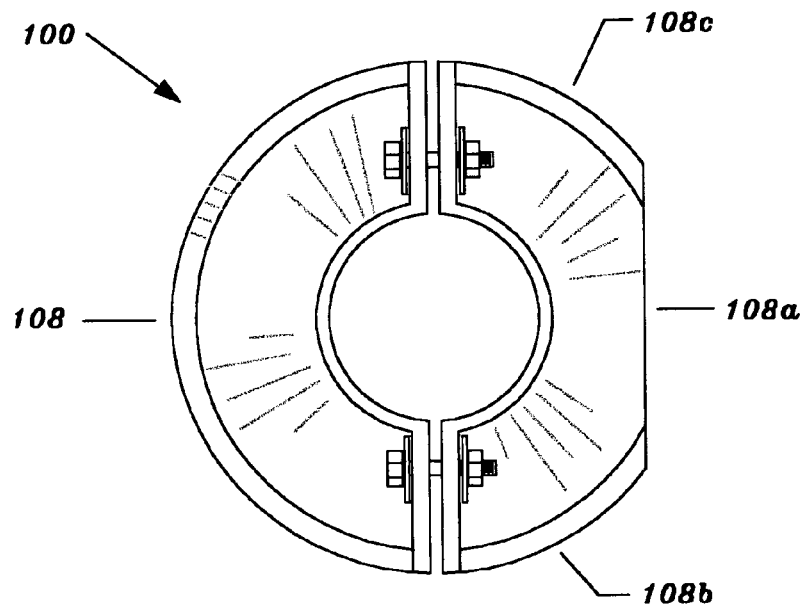
FIG. 12 is a top view of an alternate embodiment of the outer periphery of the collars, wherein the collars include a mixed combination of a collar with an arcuate periphery and a collar with a linear side intermediate to arcuate sides.

The collar 108 is seated onto the partition 68 to inhibit spreading of flames from adjacent sections, such as from floor-to-floor or room-to-room. The collar 108 covers the opening formed in the partition through which the riser 54 passes. The collar 108 may have a polygonal shape (including triangular, circular, orthogonal or other) or an irregular shape. For example, in FIG. 3 through FIG. 7, the collar 108 has a polygonal shape, and specifically an orthogonal shape. In FIG. 8 through FIG. 10, the collar 108 has a different polygonal shape, and specifically a circular shape. In FIG. 11 and FIG. 12, the collar 108 has an irregular shape, and specifically a shape defined by a linear side 108a parallel to the medial margin "M" and arcuate sides 108b and 108c, respectively, disposed between the medial margin "M" and the linear side 108a. The arcuate sides 108b and 108c separately intersect with and at opposing ends of the linear side 108a, defining a collar 108 that appears to be an arch with a flattened top or side.

As is evident from FIG. 3 through FIG. 12, any combination of shape of the collar 108 of a clamp member 102 or 104 may be adjoined together about a riser 54, since the dimension of the jacket 106 (including the radius "R") are identical. The dimensions and/or shape of the collar 108 provide versatility to the riser clamp 100 for accommodating space restrictions that may arise during construction and/or installation of risers and riser clamps. In FIG. 3 through FIG. 7, an orthogonal collar 108 is envisioned as one embodiment for installation. In FIG. 8 through FIG. 10, a circular collar 108 is envisioned as another embodiment for installation. In FIG. 11, the irregular shape collar 108 (described above) is envisioned as another embodiment. FIG. 12 depicts an embodiment for installation that combines two clamp members 102 and 104 having different collars, wherein one collar has the circular shape and the other collar has the irregular shape described above. The embodiment depicted in FIG. 12 serves as one representative example of the mixing and matching that may be performed to accommodate restrictive space requirements, wherein one clamp member 102 has a collar of irregular shape adjoined to a clamp member 104 having a collar having a polygonal shape. The irregular collar may be placed adjacent another partition, another riser or riser clamp, or any other object that may impede the ability to use a matching clamp member 102 or 104.

Referring now to FIG. 8 through FIG. 10, a riser clamp for a riser or conduit 100 is shown in accordance as one envisioned embodiment of the present invention. The riser clamp 100 is a cylindrical and tubular device comprising two substantially C-shaped clamp members 102 and 104 that are mirror images of one another, thus a detailed description of one C-shaped member 102 or 104 serves as a representative description of the remaining C-shaped member 102 or 104. Each C-shaped clamp member 102 and 104 comprises a semi-annular jacket 106, a semi-annular collar 108 circumscribing jacket 106 approximately about a horizontal midline thereon or a medial margin, and at least one aperture 110c formed in at least one flange or wing 110a or 110b provided for receiving a fastener or attachment means 112 (such as a screw and nut, a bolt, or other similar means). The apertures 110c of the respective members 102 and 104 are aligned and fastener or attachment means 112 is/are inserted and secured, thereby forming a cylindrical and tubular riser clamp 100 as depicted in FIG. 8, FIG. 9 and FIG. 10. Although the figures (specifically FIG. 13 through FIG. 16) depict the riser clamp 100 installed upon a riser or conduit 54 passing through a partition (such as a floor 68), it is to be understood that the general installation and operation of the riser clamp 100 is applicable to a wall(s) and is easily envisioned by simply rotating the figures ninety degrees (90°) in the plane of the figures as presented.

The jacket 106 is a semi-annular element constructed of a durable material that is preferably fire resistant and/or retardant. A single jacket 106 is positioned about a riser or conduit 54 and is mated at the flanges or wings 110a or 110b (via fasteners or attachment means 112) with a second jacket 106 to enclose the riser or conduit 54 within the now-formed riser clamp 100. As the jackets 106 are tightened about the riser or conduit 54, the jackets 106 rigidly support the riser or conduit 54 and reduce harmonic vibrations due to air or other matter passing through the riser or conduit 54. Furthermore, the collars 108 (now forming an annular ring about the riser clamp 100 and riser or conduit 54) provide means for sealing the existing space between the passing riser or conduit 54 and the opening or orifice 74 through which the riser or conduit 54 passes. As the jackets 106 are tightened, and the riser clamp 100 is drawn inwardly upon the riser or conduit 54 and toward the opening or orifice 74, the collars 108 are abutted against the partition 68 and cover the opening or orifice 74, thus sealing the existing space. The collars 108, like the jackets 106, are individually semi-annular and preferably constructed from flame resistant and/or retardant materials. The collar 108 is preferably an inclined flange between the outer periphery of the collar 108 and connecting to the jacket 106, the inclined flange providing structural support to the riser clamp 100.

Referring now to FIG. 11 and FIG. 12, optional peripheral configurations of the collar 108 are depicted in comparison to the circular periphery of FIG. 8, FIG. 9 and FIG. 10. In FIG. 11, the outer periphery of the clamp members 102 and 104 adjoined includes a pair of linear sides 108a aligned opposite one another, and a pair of arcuate sides 108b and 108c adjacently aligned and intermediate to the linear sides 108a, and with the collective arcuate sides also aligned opposite one another (so that arcuate side 108b of clamp member 102 is adjacent an arcuate side 108c of the clamp member 104). The arcuate sides 108b and 108c are bisected by the joint (or medial margin "M") at which the two collars 108 (and thus clamp members 102 and 104) are joined. The configuration depicted in FIG. 11 provides the advantage of reducing the surface area that the riser clamp 100 (and the collars 108, specifically) occupies after installation. The reduced surface area occupation may be especially advantageous in confined areas or areas that require remodeling or renovation. In FIG. 12, the outer periphery includes a combination of the periphery disclosed by FIG. 8 through FIG. 10 and the periphery disclosed by FIG. 11. The embodiment disclosed by FIG. 12 includes a collar 108 having an arcuate periphery (of the general type depicted in FIG. 8) and adjoined to a collar 108 having a linear side 108a intermediate to arcuate sides 108b and 108c that interface with the arcuate periphery of the opposing collar 108. The advantage of the embodiment depicted in FIG. 12 allows for modification of the riser clamp 100 if one particular portion of a wall or floor requires a reduction in occupied surface area. The flexibility provided for with the riser clamp, generally, wherein the configurations depicted in FIG. 8, FIG. 9 and FIG. 10 may be achieved, allows for on-site modifications and adjustments without having to use additional time and resources to make physical modifications to the riser clamp 100.

Figure 13:
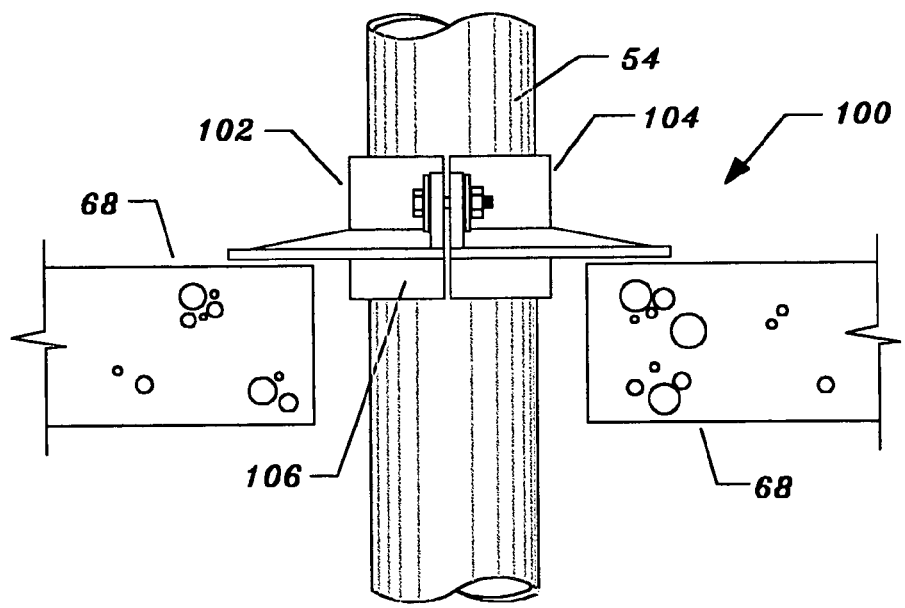
FIG. 13 is a side view of the riser clamp installed about a conduit and abutting the floor and orifice through which the orifice passes, the collars shown in partial section (the front portion of the collar facing the page is removed for clarity)
Figure 14:
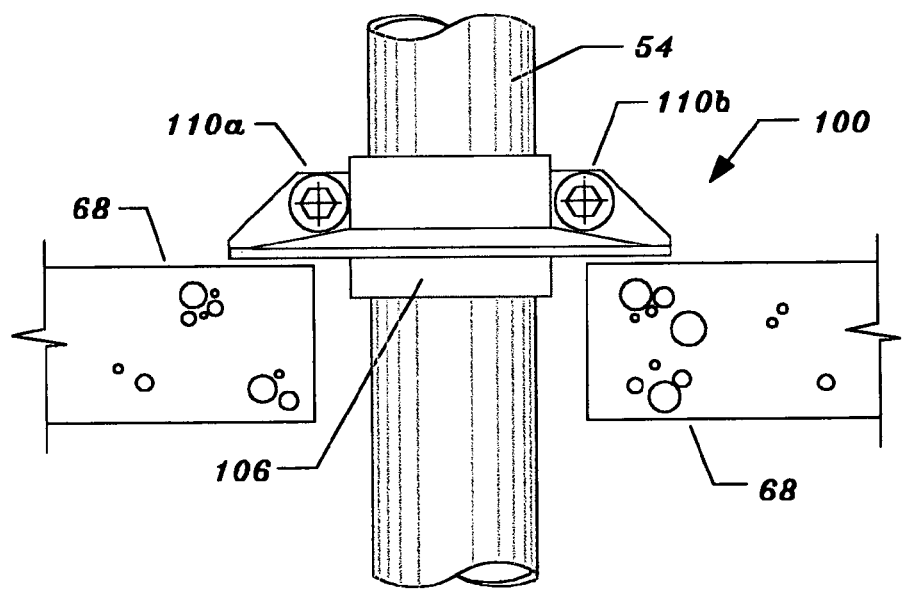
FIG. 14 is a side view of a riser clamp installed about the conduit and abutting the floor and orifice through which the orifice passes, rotated 90° from the riser clamp of FIG. 13.
Figure 15:
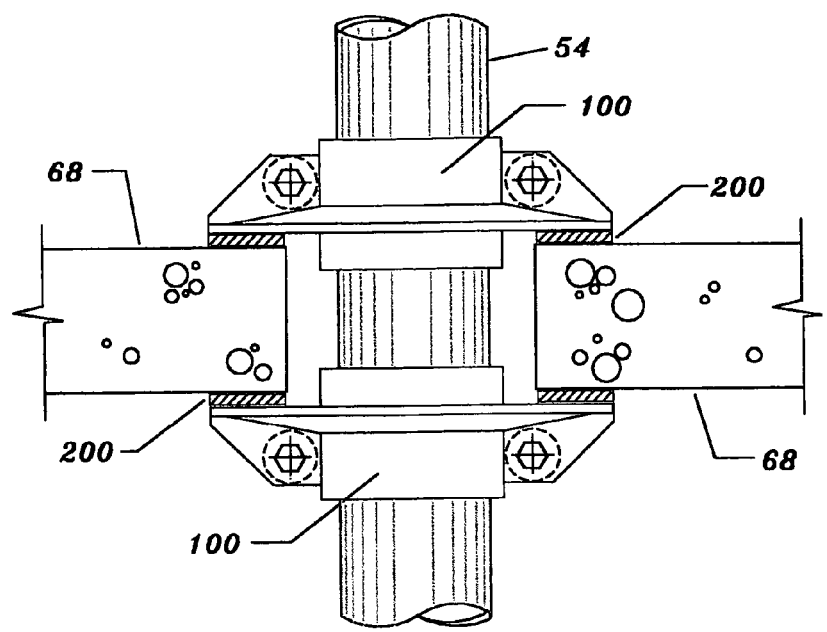
FIG. 15 is a side view and partial section of a pair of riser clamps installed about the conduit and abutting the floor on two sides of the floor or wall.

Referring now to FIG. 13 through FIG. 15, the riser clamp 100 is depicted in an installed configuration, wherein a riser or conduit 54 is simultaneously passing through a partition or floor 68 and the riser clamp 100. As is evident in FIG. 13 through FIG. 15, the collars 108 cover the existing space and work in combination with the jacket 106 to completely envelope the opening or space 74, and further uses gravity to maintain the seal, thereby preventing smoke and/or fire penetration from an adjacent floor (or wall, as the case may be). In FIG. 15, an alternate installation configuration is depicted, wherein a pair of riser clamps 100 are installed about the riser or conduit 54, a riser clamp 10 along one side of the floor 150, and a second riser clamp 10 along the opposite side of the partition or floor 68 The installation of the second riser clamp 100 is substantially identical to the installation of the first riser clamp 100. The installation of the second riser clamp 10 provides additional structural integrity and stability to the passing riser or conduit 54, while also providing additional means for prevention of penetrating smoke and/or fire through the partition or floor 68 opening or orifice 74. Thus, a method for installing a pair of riser clamps onto a single riser or conduit comprises the steps of installing a riser clamp on the riser on one side of a partition, and installing an additional riser clamp on the riser on an opposing side of the partition. The method for installing a pair of riser clamps, more specifically, includes placing one clamp member 102 or 104 onto the riser 54 so that the radius of the jacket 108 abuts and compliments the radius of the riser 54. Next, another clamp member 102 or 104 is placed onto the riser 54 in the same manner is the first clamp member. A fastener or attachment means 112 is inserted through an aperture 110c formed in the mounting flange or wing 110a or 110b, thereby adjoining and securing the two clamp members 102 and 104. Another fastener or attachment means 112 is inserted through an aperture 110c formed in the opposing or remaining mounting flange or wing 110a or 110b, thereby completely adjoining and securing the two clamp members 102 and 104 together. The fasteners 112 are tightened until snug.

Figure 16:
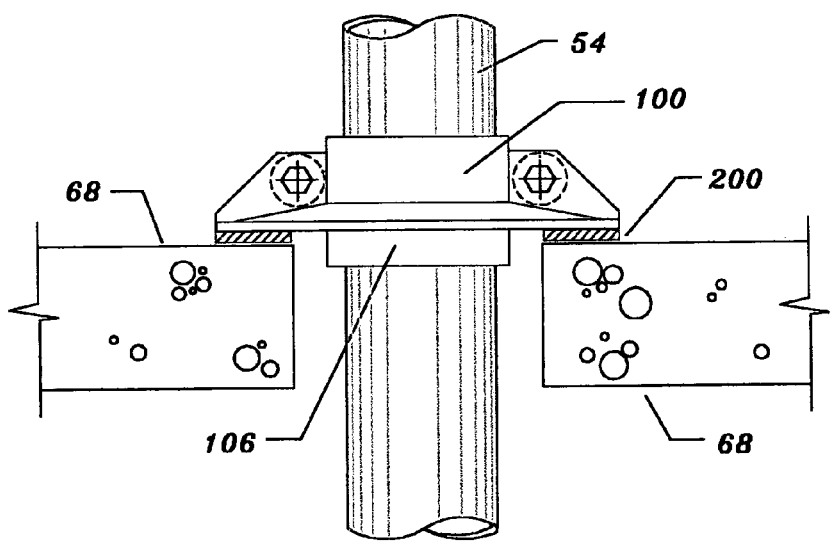
FIG. 16 is a side view of a riser clamp installed and further including an annular gasket ring inserted between the floor and the collar, thereby providing further sealing capacity.

Referring now to FIG. 16, an alternate installation configuration is shown implementing the use of an annular gasket ring 200. The annular gasket ring 200 is envisioned to be of the type that is fire resistant and/or retardant, thereby reinforcing the ability of the riser clamp 100 to block penetration of fire and/or smoke through a conduit opening. The annular gasket ring 200 may be of the type generally available in commercial hardware stores, and at least one embodiment of the ring 200 envisioned as acceptable in use with the riser clamp 10 is disclosed in U.S. Pat. No. 1,172,836 issued in the name of Roser, and indicated as reference numeral 12, as well as other annular gasket rings well known in the prior art, provided that the gasket rings 200 are manufactured from fire or flame retardant materials. The inclusion of a gasket ring 200 beneath the collar 108 during installation provides further protection of ingress or egress of smoke and/or fire. As the riser clamp 100 is further tightened about the riser or conduit 54, the riser clamp 100 is compressed upon the gasket ring 200, thereby forming a seal. It is further envisioned that in accordance with the embodiment disclosed in FIG. 15, a pair of gasket rings 200 may be used, wherein one ring 200 is placed between one riser clamp 100 and the partition 68, and the other ring 200 is placed between the other riser clamp 100 and the partition 68 on the opposing side of the partition. This embodiment would result in a firmly sealed and secured installation that would optimize the benefits provided by the combination of the riser clamp 100 and the gasket ring 200 to prevent or inhibit flame spread and heat transfer between sections of a building. It is further envisioned that other fire resistant or flame retardant materials may be used in combination with the riser clamp 100 to prevent smoke and gas, or other harmful materials, from spreading to an adjacent floor or room.

Figure 17:
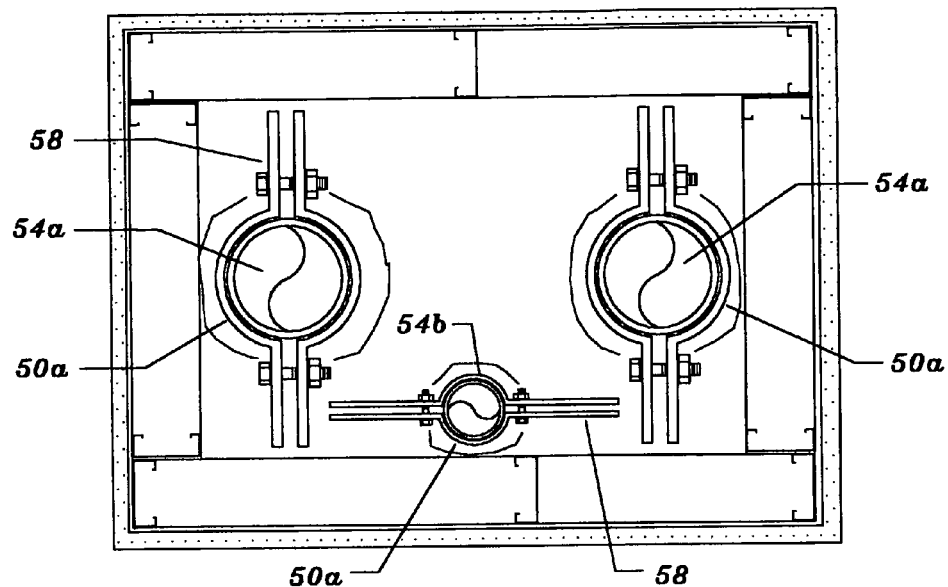
FIG. 17 is a plan view of the "PRIOR ART" installation of conventional riser clamps onto several risers, wherein the risers are adjacently spaced to accommodate the arms of the conventional riser clamps, thereby failing to maximize the construction space available.
Figure 18:
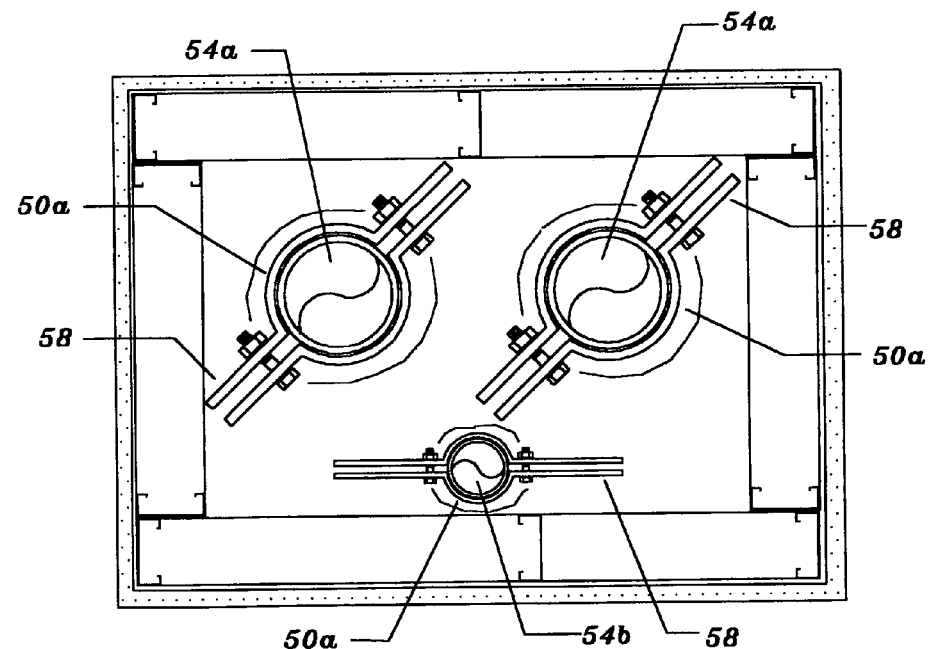
FIG. 18 is a plan view of an alternate "PRIOR ART" installation as depicted in FIG. 17, with minimally improved space maximization.
Figure 19:
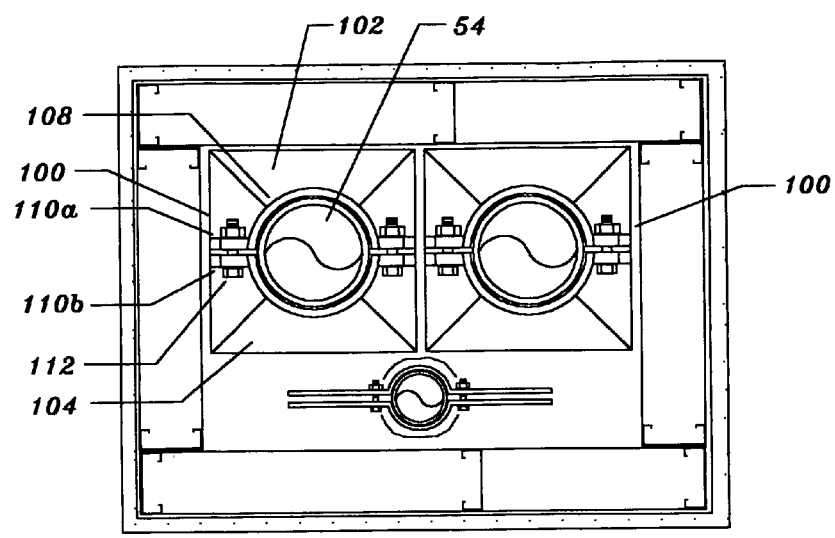
FIG. 19 is a plan view of the use of riser clamps of the present invention installed on a pair of riser clamps, though a plurality of risers and riser clamp installations are envisioned, wherein the risers are more compactly arranged so as to maximize the construction space available.
Figure 20:
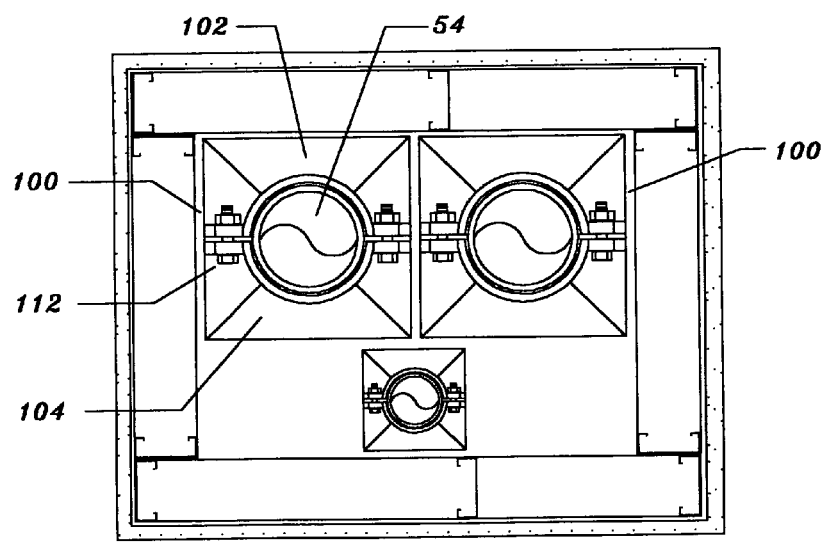
FIG. 20 is a plan view of an alternate installation as depicted in FIG. 19 further improving space maximization.
Figure 21:
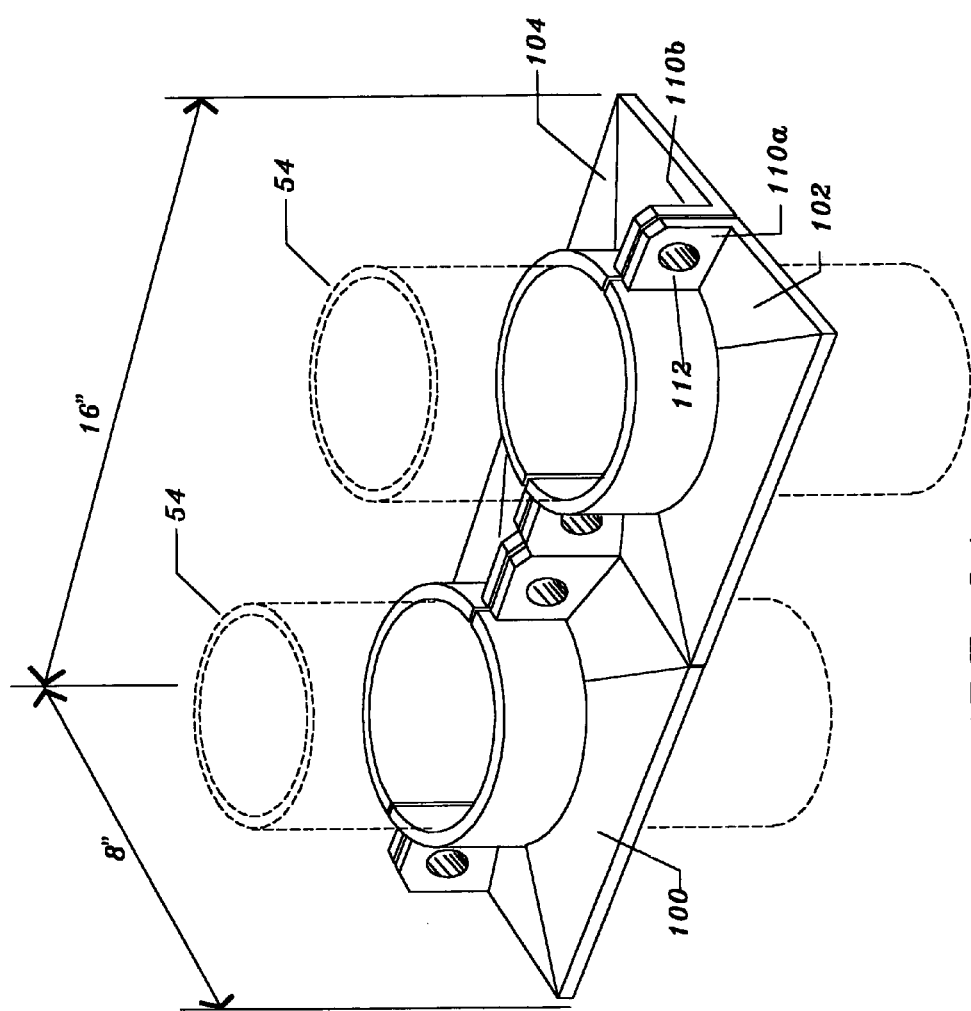
FIG. 21 is a perspective view of an embodiment of multiple riser clamps installed on multiple and adjacent risers.
Figure 22:
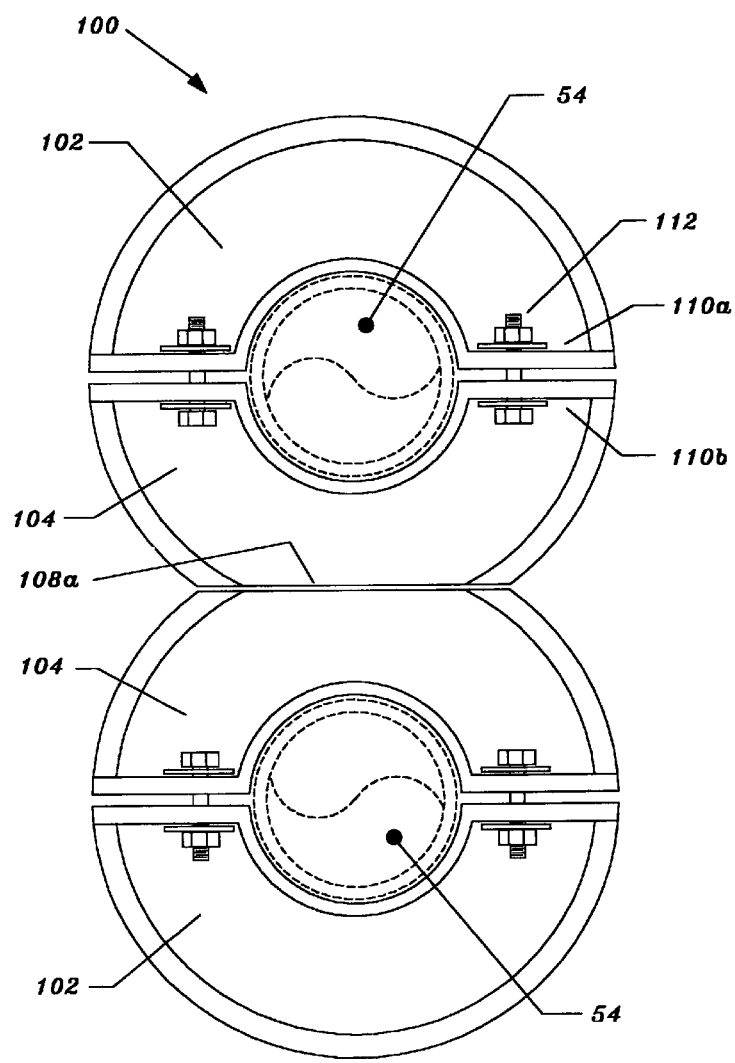
FIG. 22 is a plan view of a plurality of riser clamps adjacently arranged to accommodate adjacently spaced risers, wherein the riser clamps have clamp members with collars that are a combination of a polygonal shape and an irregular shape, as is envisioned and depicted in FIG. 12.

FIG. 17 and FIG. 18 depict the common installation process and result known in the art, wherein riser clamps are installed on a riser, and subsequent risers are spaced so as to accommodate the length of the riser clamps. This method results in an inefficient use of space that may be critical to construction of a particular building. FIG. 19 through FIG. 22 depict the preferred method of installing a plurality of riser clamps on a plurality of risers is depicted. The method may be summarized as comprising the steps of installing a riser clamp on a first riser on a side of a partition; installing another riser clamp on a second riser adjacent the first riser on the side of the partition; and repeating installation of additional riser clamps on additional risers. Thus, adjacent risers will be fitted with separate riser clamps as depicted in FIG. 19 through FIG. 22. The method for installing multiple riser clamps may further comprise the step of installing an additional riser clamp on the first riser or the second riser on an opposing side of the partition, so that one of the plurality of risers includes a riser clamp installed on one side of the partition and a riser clamp installed on the other or opposing side of the partition. The method for installing multiple riser clamps may further comprise the step of installing an additional riser clamp on the remaining first riser or the remaining second riser on an opposing side of the partition, so that one of the remaining plurality of risers includes a riser clamp installed on one side of the partition and a riser clamp installed on the other or opposing side of the partition. In combination, the aforementioned steps result in the installation of riser clamps on adjacent risers, and on both (opposing) sides of a partition, provided increased stability, reduced likelihood of riser slippage, and increased load bearing capacity. The method for installing multiple riser clamps may further comprise the step of repeating installation of any additional riser clamps on the opposing side of the partition to any remaining risers, so that a collection of multiple risers, especially exceeding the two riser description above and including the three riser example provided in the figures, are secured by riser clamps on each (opposing) side of the partition.

The method for installing multiple riser clamps, as noted above, specifically includes placing one clamp member 102 or 104 onto the riser 54 so that the radius of the jacket 108 abuts and compliments the radius of the riser 54. Next, another clamp member 102 or 104 is placed onto the riser 54 in the same manner is the first clamp member. A fastener or attachment means 112 is inserted through an aperture 110c formed in the mounting flange or wing 110a or 110b, thereby adjoining and securing the two clamp members 102 and 104. Another fastener or attachment means 112 is inserted through an aperture 110c formed in the opposing or remaining mounting flange or wing 110a or 110b, thereby completely adjoining and securing the two clamp members 102 and 104 together. The fasteners 112 are tightened until snug. This specific method is repeated on each side of the partition 68 in which a riser clamp 100 and clamp member 102 and 104 are installed on a riser 54.

The riser clamp 100, and the clamp members 102 and 104, may be manufactured from a variety of materials and in a variety methods. It is envisioned that at least one preferred material of construction is the use of most metal, especially of the type that sufficiently possesses the requisite tensile strength to maintain the rigid coupling about a conduit. Further, the metal is extremely resistant to fire and/or smoke penetration. Other fire resistant and/or retardant materials are also envisioned as being appropriate for use in manufacturing the riser clamp 100. The riser clamp 100 may be manufactured from extrusion of metal or other appropriate fire resistant and/or retardant material. Or, casting of the material may be performed. Other similar processes known in the art are also accepted as appropriate methods of manufacture.

It is envisioned that the riser clamp 100 is at least a dual purposed device, firmly and securely supporting a column of riser, pipe or conduit filled with material, while also covering the opening through which the riser, pipe or conduit is passing in the partition. In doing so, the riser clamp 100 prevents the riser from slipping and inflicting damage and/or injury as a result, while also preventing the spread of harmful gas, smoke, flame or other materials from adjacent floors or rooms. It is further envisioned that the riser clamps 100 may function as a decorative escutcheon as an aesthetically pleasant alternative to the riser clamps presently available.

2. Examples

Two versions of the riser clamp were subjected to laboratory testing to measure the load bearing capabilities of the riser clamp versions. One version of the riser clamp is labeled as a "Pipe Riser Support Clamp" (PRSC), and which may be represented by the embodiment disclosed in FIG. 3, and the other version is labeled as a "Space Saver Clamp" (SSC), which may be represented by the embodiment disclosed in FIG. 11. The clamps are nearly identical, wherein the jacket has a four-inch diameter, differing only in that the collar configuration of the SSC has been altered to allow the riser clamp to be placed closer to adjacent risers or to a wall or other obstruction that restricts construction space.

The load bearing capacity measurements of the "Pipe Riser Support Clamp" are provided in Table I.

TABLE I

PIPE RISER SUPPORT CLAMP

| Load (lbs) | Displacement (inches) |
| --- | --- |
| 0 | 0.00 |
| 350 | 0.01 |
| 1400 | 0.02 |
| 3000 | 0.03 |
| 5000 | 0.04 |
| 6500 | 0.05 |
| 7000 | 0.06 |
| 6900 | 0.07 |
| 6850 | 0.08 |
| 6850 | 0.09 |
| 6850 | 0.10 |
| 7050 | 0.20 |
| 7300 | 0.30 |
| 7600 | 0.40 |
| 7800 | 0.50 |

The PRSC was positioned about the pipe, so that the jacket (or clamp throat) fit snugly around the pipe barrel. The fasteners (bolts) used to couple the clamp members were each torqued to 75 ft. lbs. (In accordance with the bolt specifications). The riser clamp rested upon a steel pipe equal to a six inch (6") floor sleeve opening. A load (pressure) was applied to the pipe until the pipe slipped within the throat of the riser clamp. The PRSC was not significantly displaced from the pipe until a load of approximately 7000 lbs. was applied, occurring between 0.06 inches of displacement and 0.20 inches of displacement. The pipe was displaced from approximately 0.10 inches to approximately 0.20 inches as the load increased from approximately 6850 lbs. to approximately 7050 lbs. of pressure. At this point, the PRSC riser clamp did not suffer any breakage or distortion at this load. The testing was terminated approximately when the pipe began slipping from the riser clamp, resulting in additional measurements beyond the capacity limit (for slippage) that indicate a requirement of 7800 lbs. before displacing the pipe 0.50 inches.

The load bearing capacity measurements of the "Space Saver Clamp" are provided in Table II.

TABLE II

SPACE SAVER CLAMP

| Load (lbs) | Displacement (inches) |
| --- | --- |
| 0 | 0.000 |
| 1400 | 0.025 |
| 2000 | 0.030 |
| 2700 | 0.035 |
| 3400 | 0.040 |
| 3900 | 0.045 |
| 4250 | 0.050 |
| 4650 | 0.055 |
| 5000 | 0.060 |
| 5700 | 0.075 |
| 6150 | 0.100 |
| 7000 | 0.150 |
| 7600 | 0.200 |
| 8050 | 0.250 |

The SSC was tested under the same conditions as the PRSC. Of note, however, is that the SSC did not mate as well with the pipe barrel in comparison to the PRSC, and the SSC riser clamp had a jacket (throat) that was painted. Nonetheless, the SSC riser clamp experienced no significant displacement until a load of approximately 4650 lbs. was placed on the pipe and SSC riser clamp, occurring between 0.055 inches of displacement and 0.100 inches of displacement. Likewise, the SSC riser clamp did not experience any breakage or distortion at this load. The testing was terminated approximately when the pipe began slipping from the riser clamp, resulting in additional measurements that indicate a requirement of 8050 lbs. before displacing the pipe 0.250 inches.

Recalling the prior art riser clamp discussed previously, a riser clamp from B-LINE® Systems, Inc. corresponding to a nominal pipe diameter of four (4) inches (indicated as part number B3373-4) has a design load capacity of approximately 810 pounds. By comparison, the PRCS (Table I) (embodiment of FIG. 3) indicates a design load capacity of approximately 7000 pounds, an improvement of over 864% compared to the B-LINE® Systems, Inc. riser clamp. The SSC (Table II) (embodiment of FIG. 11) indicates a design load capacity of approximately 4650 pounds, an improvement of over 574% compared to the B-LINE® Systems, Inc. riser clamp.

The results of the laboratory testing of the two riser clamps indicate that the PRCS riser clamp is capable of supporting a column of steel pipe filled with water to an equivalent height of a thirty (30) story building, and the SSC riser clamp capable of supporting a similar column of steel pipe filled with water to an equivalent height of a twenty (20) story building. Alteration of the collar shape (from the full collar of the PRCS to the altered collar of the SSC) did not appreciably affect the load capacity of the riser clamps. Furthermore, even under less-than-ideal of mating between the SSC riser clamp and the pipe (as indicated above), and with a painted jacket (throat) surface that may have encouraged slippage of the pipe within the SSC riser clamp, the SSC riser clamp supported a much greater load capacity (improvement of 574%) than that of the conventional riser clamp typified by the B-LINE® Systems, Inc. device.

3. Operation of the Preferred Embodiment

To use the present invention, a user would fit the pair of clamp members 102 and 104 about a riser 54 and insert fasteners 112 through the apertures 110c provided, thereby adjoining the members 102 and 104 in a configuration that forms a cylindrical and tubular riser clamp 100. The riser clamp 100 is manipulated about the riser 54 so that the collar 108 abuts the partition (floor or wall) 68, and covers the existing space between the riser 54 and the partition 68. The fasteners 112 are tightened until the riser clamp 100 is snugly mating and abutting the riser 54, thereby providing structural integrity and stability to the passing riser 54 and a barrier (via collar 108) to prevent the ingress and egress of smoke and/or fire.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents. Therefore, the scope of the invention is to be limited only by the following claims.

What is claimed is:

1. A riser clamp comprising a pair of clamp
members adjoined to a riser,
wherein said clamp members comprise:
   a semi-annular jacket seated against the riser;
   a collar circumscribing said jacket, said collar covering an opening formed in a partition through which the riser passes; and
   a pair of mounting flanges depending from said jacket and said collar, said mounting flanges extending laterally in opposing directions from said jacket and coplanar to a medial margin, each one of said mounting flanges accommodating a fastener for adjoining said pair of clamp members, wherein said collar has an irregular shape comprising a linear side parallel to said medial margin and arcuate sides disposed between said medial margin and said linear side, said arcuate sides intersecting with said linear side at opposing ends thereof.

2. The riser clamp of claim 1, wherein said clamp members are manufactured from metal to inhibit spreading of flames from adjacent sections, and further inhibiting heat transfer from adjacent sections.

3. The riser clamp of claim 1, wherein said jacket comprises:
   a radius complimentary to a radius of the riser;
   a vertical length exceeding a vertical width of said collar; and
   said radius and said vertical length providing increased surface area contacting the riser, thereby reducing point load on the partition.

4. The riser clamp of claim 3, wherein said jacket has increased surface area contacting the riser, thereby increasing weight bearing capacity of said clamp members and preventing slippage of the riser from said clamp members.

5. The riser clamp of claim 1, wherein said collar is seated onto said partition to inhibit spreading of flames from adjacent sections.

6. A riser clamp comprising a pair of clamp
members adjoined to a riser,
wherein said clamp members comprise:
   a semi-annular jacket seated against the riser;
   a collar circumscribing said jacket, said collar covering an opening formed in a partition through which the riser passes; and
   a pair of mounting flanges depending from said jacket and said collar, said mounting flanges extending laterally in opposing directions from said jacket and coplanar to a medial margin, each one of said mounting flanges accommodating a fastener for adjoining said pair of clamp members, wherein one of said clamp members has a collar of irregular shape adjoined to one of said clamp members having a collar having a polygonal shape.

7. The riser clamp of claim 6, wherein said jacket comprises:
   a radius complimentary to a radius of the riser;
   a vertical length exceeding a vertical width of said collar; and
   said radius and said vertical length providing increased surface area contacting the riser, thereby reducing point load on the partition.

8. The riser clamp of claim 7, wherein said jacket has increased surface area contacting the riser, thereby increasing weight bearing capacity of said clamp members and preventing slippage of the riser from said clamp members.

9. The riser clamp of claim 6, wherein said collar is seated onto said partition to inhibit spreading of flames from adjacent sections.

10. The riser clamp of claim 6, wherein said clamp members are manufactured from metal to inhibit spreading of flames from adjacent sections, and further inhibiting heat transfer from adjacent sections.

* * * * *